US000001177H

United States Statutory Invention Registration [19]

[11] Reg. Number: H1177

Kosah

[43] Published: Apr. 6, 1993

[54] RADIOACTIVELY BIASED OPTICAL LIMITER

[75] Inventor: David J. Kosah, Palm Bay, Fla.

[73] Assignee: The United States of America as represented by the Secretary of the Air Force, Washington, D.C.

[21] Appl. No.: 422,163

[22] Filed: Oct. 16, 1989

[51] Int. Cl.[5] ..... H01S 3/10

[52] U.S. Cl. ..... 372/11; 313/54; 313/117; 359/738

[58] Field of Search ..... 350/1.51, 311, 312, 350/354; 372/11; 250/474.1, 482.1; 356/437, 234; 357/29, 30; 313/54, 117; 307/425–428

[56] References Cited

U.S. PATENT DOCUMENTS

| | | | |
|---|---|---|---|
| 3,620,597 | 11/1971 | Schwartz et al. | 307/426 |
| 3,772,608 | 11/1973 | Gleason | 313/54 |
| 3,814,503 | 6/1974 | Milan | 350/363 |
| 3,815,047 | 6/1974 | Smith et al. | 372/11 |
| 3,986,139 | 10/1976 | Meneely et al. | 372/11 |
| 3,999,144 | 12/1976 | Bret | 350/312 |
| 4,123,682 | 10/1978 | Lange et al. | 313/54 |
| 4,194,813 | 3/1980 | Benjamin et al. | 350/354 |
| 4,410,239 | 10/1983 | Kaplan et al. | 350/354 |
| 4,890,075 | 12/1989 | Pohlman et al. | 350/312 |

OTHER PUBLICATIONS

Boyle et al., "Eye/Sensor Protection against Laser . . . Materials". NTIS, AP-A210599/7/XAB, Jun. 12, 1989, 100P, abst. only supplied.

Pereira, N.R.; "Radioactive Preionization in . . . Lasers". J. Appl. Phys., vol. 56, #7, pp. 2180–2182, Oct. 1, 1984, abst. only supplied.

Olvi et al.; "Radioisotope preionizer, . . . Laser Systems". STS. Press, McLean, Va., pp. 581–587, Dec. 6, 1985, abst. only supplied.

Ganger, B.; "The Influence of Preionization . . . Gap"; Bull. Assoc. Suisse Electr., vol. 72 #3, pp. 126–131, Feb. 1981, abst. only provided.

*Primary Examiner*—Bernharr E. Gregory

*Attorney, Agent, or Firm*—Donald J. Singer; Bobby D. Scearce

[57] ABSTRACT

A radioactively biased optical power limiter device is described which comprises first and second lenses disposed along an optical axis with a common focal plane therebetween, the first lens disposed for receiving electromagnetic energy input directed along the optical axis and focusing the input at the focal plane of the first and second lenses, a cell of optically nonlinear material disposed along the optical axis at the focal plane of the lenses, and a radioactive source of ionizing radiation disposed near or in the nonlinear material for selectively controlling the electromagnetic field level necessary to cause optical nonlinear effects in the cell.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

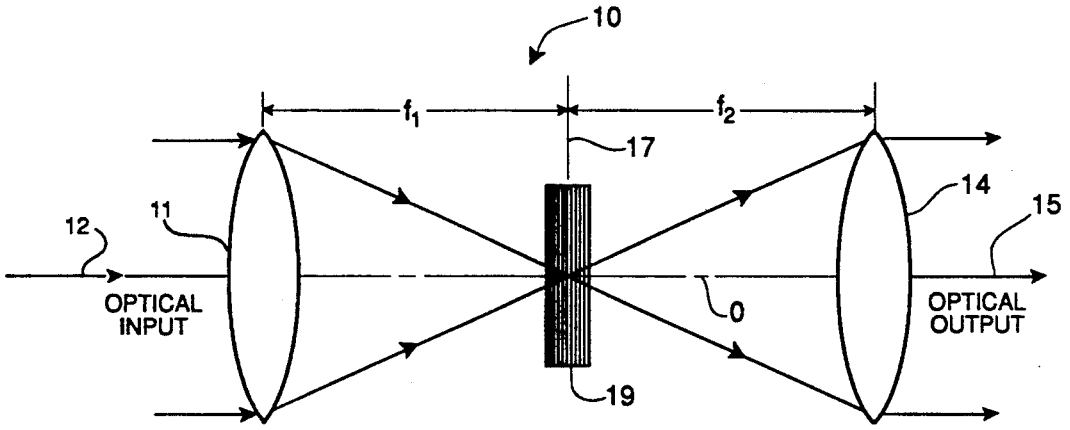
*Fig. 1* PRIOR ART
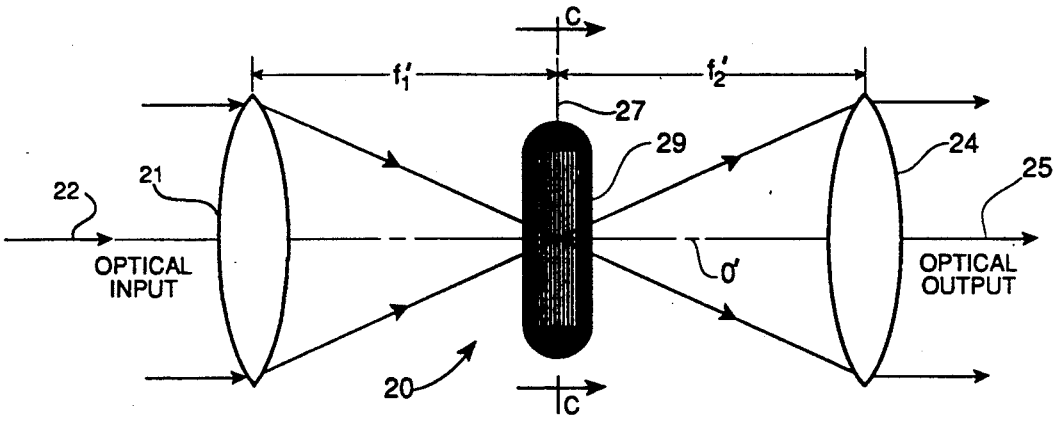
*Fig. 2*
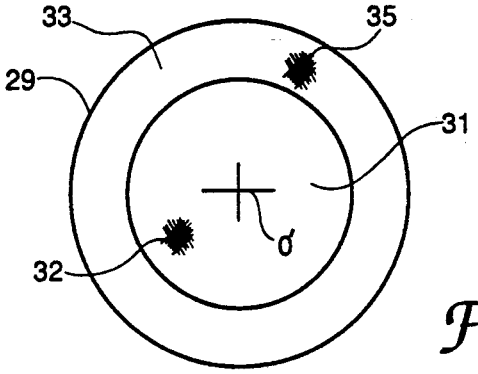
*Fig. 3*

RADIOACTIVELY BIASED OPTICAL LIMITER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical power limiter devices, and more particularly to a radioactively biased optical power limiter which utilizes energy from a radioactive source to lower the local electromagnetic field necessary to incur nonlinear optical effects in an optical power limiter.

The invention provides controlled passive limiting and/or switching of electromagnetic energy using the energy of particles emitted from a radioactive source to lower the nonlinear/switching threshold at the focal plane of an optical power limiter. A cell of nonlinear material is located at a common focal plane between two positive lenses and radioactive source material is selectively introduced to controllably modify the electromagnetic field level necessary to cause optical nonlinear effects.

It is therefore a principal object of the invention to provide a radioactively biased optical power limiter having controlled passive limiting and/or switching of electromagnetic energy.

It is a further object of the invention to provide an optical limiter having low nonlinear/switching threshold utilizing a radioactive source.

It is yet a further object of the invention to provide an optical power limiter having minimum local electromagnetic field necessary to incur nonlinear optical effects.

These and other objects of the invention will become apparent as the detailed description of representative embodiments proceeds.

SUMMARY OF THE INVENTION

In accordance with the foregoing principles and objects of the invention, a radioactively biased optical power limiter device is described which comprises first and second lenses disposed along an optical axis with a common focal plane therebetween, the first lens disposed for receiving electromagnetic energy input directed along the optical axis and focusing the input at the focal plane of the first and second lenses, a cell of optically nonlinear material disposed along the optical axis at the focal plane of the lenses, and a radioactive source of ionizing radiation disposed near or in the nonlinear material for selectively controlling the electromagnetic field level necessary to cause optical nonlinear effects in the cell.

DESCRIPTION OF THE DRAWINGS

The invention will be more clearly understood from the following detailed description of representative embodiments thereof read in conjunction with the accompanying drawings wherein:

FIG. 1 illustrates a prior art optical power limiter;

FIG. 2 illustrates an optical power limiter according to the invention;

FIG. 3 is a sectional view taken along lines C—C of FIG. 2; and

DETAILED DESCRIPTION

Figure 4:
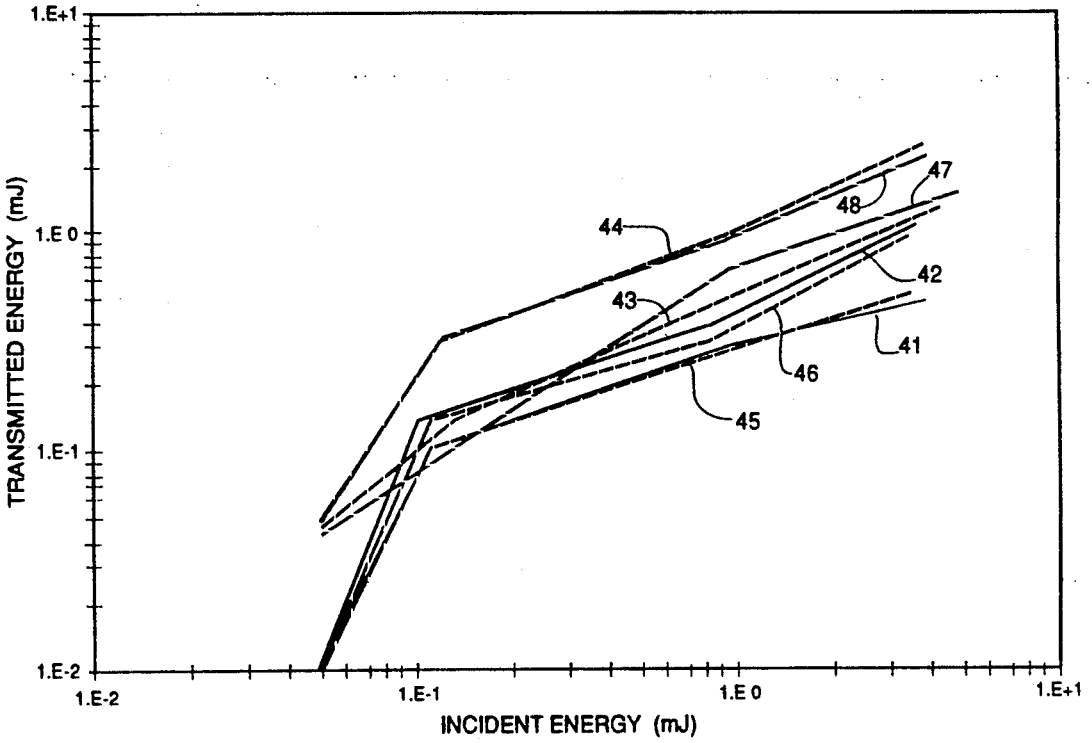
FIG. 4 shows graphs of incident energy versus transmitted energy for various nonlinear materials with and without $Co^{60}$.

Referring now to the drawings. FIG. 1 illustrates one form of a prior art optical power limiter 10 comprising a first lens 11 having focal length $f_1$ for receiving an optical input 12 and a second lens 14 having focal length $f_2$ for projecting optical output 15. In limiter 10, lenses 11,14 are disposed in spaced relationship along axis 0 with separation $f_1+f_2$ to define a common focal plane 17 therebetween. In limiter 10 it is common to place at focal plane 17 a volume or cell 19 of material having nonlinear optical properties. Materials typically used within cell 19 include xenon, argon, hydrogen, oxygen, carbon disulfide, silicon, germanium, as well as various mixtures, solutions and suspensions, for example, germanium in 1-$ClC_{10}H_7$ or carbon in carbon disulfide. Cell 19 may have the or disk shape suggested in FIG. 1. Since optical input 12 is focused by lens 11, a large optical gain exists at focal plane 17, and the amount of energy, power or magnitude of electromagnetic field necessary at input 12 to cause nonlinear effects in cell 19 is reduced by a factor proportional to the optical gain as compared to an optical system wherein nonlinear material is not located at a focal plane between the input and output. Typical thicknesses of nonlinear materials required to produce the desired effect are in the range of about 0.1 to 10 centimeters.

In accordance with a governing principle of the invention, the magnitude of the electromagnetic field necessary to cause optical nonlinear effects is controllable by selectively introducing radioactivity into a cell of nonlinear material at the focal plane of the optical power limiter to modify the electromagnetic field level necessary to cause nonlinear effects. Referring now to FIG 2, shown therein is optical power limiter 20 structured according to the invention. FIG. 3 is a view along line C—C of FIG. 2. In a configuration corresponding to the conventional structure depicted in FIG. 1, power limiter 20 may include first lens 21 having focal length $f'_1$ for receiving optical input 22 and second lens 24 having focal length $f'_2$ for projecting optical output 25, lenses 21,24 being disposed in spaced relationship along axis O' with separation $f'_1+f'_2$ to define common focal plane 27 therebetween. Cell 29 at focal plane 27 of power limiter 20 may include a central portion 31 containing a material 32 having nonlinear optical properties, including those materials listed above for optical power limiter 10 of FIG. 1. Surrounding portion 31 is a region 33 of cell 29 containing radioactive material 35. Ionizing radiation from radioactive material 35 interacts with materials in cell 29 located at focal plane 27. The interaction consists of high energy decay products from radioactive material 35 ionizing a fraction of material 32 in cell 29. This ionization produces free electrons which are capable of interacting with the optical electromagnetic field. It is through these types of the electron-field interactions that nonlinear optical effects are observed, for example, through free carrier absorption and photorefractive effects. Cell 29 may comprise a housing of optical plastics, glasses or crystals, or other material substantially transparent to optical input 12 for containing nonlinear material 32 and source material 35. A wide assortment of radioactive source materials 35 may be used within cell 29 within the contemplation of the invention herein. For example, representative alpha, beta and gamma sources which may be used are listed in TABLE I.

TABLE I

| Alpha Sources | Beta Sources | Gamma Sources |
|---|---|---|
| Nd-144 | H-3 | Bi-210 |
| Hf-174 | Be-10 | Ra-226 |
| Bi-210 | C-14 | Co-60 |
| Ra-226 | Si-32 | Na-22 |
| Th-230 | Ar-39 | Th-230 |
| Th-232 | Co-60 | Th-232 |
| Pa-231 | Ni-63 | U-233 |
| U-233 | Se-79 | Nb-94 |
| NP-237 | Kr-85 | Pb-210 |
| Am-243 | Nb-94 | Am-243 |

Source type and form (alpha, beta or gamma) are radionuclide may be selected by one skilled in the applicable art guided by these teachings according to the type and form of selected nonlinear material within region 31 and the intended application for power limiter 20.

Radioactive material 35 may be of any suitable overall size and shape to accommodate the overall configuration of power limiter 20 may be separately encapsulated and disposed around and near nonlinear material 32 or dispersed therein, and may be introduced into cell 29 in any manner as would occur to one with skill in the field of the invention guided by these teachings. For example, radioactive material 35 may be in the form of a particle suspension in a host nonlinear gas or liquid or as a matrix mixture in a solid. Further, nonlinear material 32 within portion 31 may itself be a radioactive source, for example in the form of a gas cell containing tritium mixed with (nonlinear) xenon, or in the form of $Be^{10}$ in a gaseous carrier of xenon. Typical source strengths which produce the intended effects upon interaction with nonlinear material 32 of region 31 correspond to alpha, beta or gamma source intensities of about 1 to 100 microcuries.

Referring now to FIG. 4, shown therein are graphs of transmitted energy versus incident energy for various nonlinear materials with and without a $Co^{60}$ source near the nonlinear material. In the examples shown in FIG. 4, graphs 41 and 42 are for germanium respectively without and with a source, graphs 43 and 44 are for copper respectively without and with a source, graphs 45 and 46 are for carbon respectively without and with a source, and graphs 47 and 48 are for copper phthalocyanine respectively without and with a source.

The invention therefore provides a radioactively biased optical power limiter. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical power limiter device, comprising:

(a) first and second lenses having respective first and second focal lengths disposed along an optical axis and with spacing therebetween equal to the sum of said first and second focal lengths whereby a focal plane common to both said first and second lenses is defined along said axis between said first and second lenses;

(b) said first lens disposed for receiving electromagnetic energy input directed along said optical axis and focusing the input at said focal plane and said second lens disposed for projecting electromagnetic energy output along said optical axis;

(c) a cell comprising optically nonlinear material disposed along said optical axis at said focal plane common to said first and second lenses; and (d) a radioactive source of ionizing radiation disposed near said nonlinear material for selectively irradiating said optically nonlinear material with said ionizing radiation and thereby controlling the electromagnetic field level necessary to cause optical nonlinear effects within said optically nonlinear material.

2. The optical power limiter device of claim 1 wherein said optically nonlinear material comprises a material selected from the group consisting of xenon, argon, hydrogen, oxygen, carbon disulfide, silicon, and germanium.

3. The optical power limiter device of claim 1 wherein said radioactive source is an alpha source selected from the group consisting of Nd-144, Hf-174, Bi-210, Ra-226, Th-230, Th-232, Pa-231, U-233, Np-237, and Am-243.

4. The optical power limiter device of claim 1 wherein said radioactive source is a beta source selected from the group consisting of H-3, Be-10, C-14, Si-32, Ar-39, Co-60, Ni-63, Se-79, Kr-85, and Nb-94.

5. The optical power limiter device of claim 1 wherein said radioactive source is a gamma source selected from the group consisting of Bi-210, Ra-226, Co-60, Na-22, Th-230, Th-232, U-233, Nb-94, Pb-210, and Am-243.

* * * * *